(12) United States Patent
Davis

(10) Patent No.: US 10,132,048 B1
(45) Date of Patent: Nov. 20, 2018

(54) NON-STICK, ASPHALT-RESISTIVE TOOL AND ASSOCIATED USE THEREOF

(71) Applicant: Eddie Davis, Yucaipa, CA (US)

(72) Inventor: Eddie Davis, Yucaipa, CA (US)

(*) Notice: Subject to any disclaimer, the term of this patent is extended or adjusted under 35 U.S.C. 154(b) by 0 days.

(21) Appl. No.: 15/600,662

(22) Filed: May 19, 2017

Related U.S. Application Data

(60) Provisional application No. 62/338,721, filed on May 19, 2016.

(51) Int. Cl.
| | | |
|---|---|---|
| *E01C 19/45* | (2006.01) | |
| *E01C 19/44* | (2006.01) | |
| *A01B 1/04* | (2006.01) | |
| *A01B 1/02* | (2006.01) | |
| *E01C 19/52* | (2006.01) | |

(52) U.S. Cl.
CPC .............. *E01C 19/45* (2013.01); *A01B 1/022* (2013.01); *A01B 1/04* (2013.01); *E01C 19/44* (2013.01); *A01B 1/02* (2013.01); *E01C 19/526* (2013.01)

(58) Field of Classification Search
CPC ........ E01C 19/44; E01C 19/45; E01C 19/526; A01B 1/02; A01B 1/022; A01B 1/04; A01B 1/122; E01H 1/12
USPC ......... 294/49, 50, 51; 404/97, 118; 15/245.1
See application file for complete search history.

(56) References Cited

U.S. PATENT DOCUMENTS

| | | | | |
|---|---|---|---|---|
| 3,053,311 A | * | 9/1962 | Nottage ................ | E01C 19/187 126/401 |
| 3,090,066 A | * | 5/1963 | Ferrell, Jr. ............. | E01C 19/44 15/144.1 |
| 3,879,079 A | * | 4/1975 | Nicholas ............... | E01H 1/1206 294/1.4 |
| 4,070,128 A | * | 1/1978 | Garrison ................ | E01C 19/43 15/144.4 |
| 4,702,641 A | * | 10/1987 | Naser ..................... | E01C 19/44 15/235.8 |
| D324,980 S | * | 3/1992 | Owens ............................ | D8/45 |
| 5,699,700 A | * | 12/1997 | Carmien ................ | A01B 1/02 29/525.12 |
| 5,727,831 A | * | 3/1998 | Dritlein, Jr. ............. | A01B 1/02 294/51 |
| 5,778,482 A | * | 7/1998 | Sbrigato ............... | E04F 21/241 15/235.4 |
| 5,799,996 A | * | 9/1998 | Fredrickson ............ | A01B 1/20 172/375 |
| 7,845,695 B2 | * | 12/2010 | Eyton ................... | E01H 1/1206 294/1.4 |
| 8,066,311 B2 | * | 11/2011 | Axelrod ................ | E01H 1/1206 294/1.4 |
| 2005/0184542 A1 | * | 8/2005 | Moreschini ............. | E01H 5/02 294/54.5 |

* cited by examiner

*Primary Examiner* — Dean J Kramer
(74) *Attorney, Agent, or Firm* — Ashkan Najafi

(57) ABSTRACT

A hand tool includes an elongated handle suitably sized and shaped for handling HMA, and an implement attached to a distal end of the elongated handle. Such an implement includes: a non-stick, asphalt-resistant top layer, and a metal core directly attached to the non-stick, asphalt-resistant top layer, and a non-stick, asphalt-resistant bottom layer directly attached to the metal core. Notably, the metal core is intercalated between the non-stick, asphalt-resistant top layer and the non-stick, asphalt-resistant bottom layer. Advantageously, each of the non-stick, asphalt-resistant top layer and the non-stick, asphalt-resistant bottom layer prohibits hot mix asphalt from adhering onto the implement.

1 Claim, 7 Drawing Sheets

NON-STICK, ASPHALT-RESISTIVE TOOL AND ASSOCIATED USE THEREOF

CROSS REFERENCE TO RELATED APPLICATIONS

This is a non-provisional patent application that claims the benefit of U.S. provisional patent application No. 62/338,721 filed May 19, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to HMA tools and, more particularly, to a line of tools and equipment including lute rakes, shovels and truck boxes for use in the hot mix asphalt (HMA) construction industry, with these implements coated in a nonstick Teflon® or ceramic material for providing an environmentally friendly alternative to traditional tools and ones which can be easily cleaned after a job is complete, without the use of illegal chemical solvents.

Prior Art

There are over 2.27 million miles of paved roads in the United States, in addition to thousands of miles of paved parking lots, airport landing strips and driveways. Importantly, over 94 percent of these surface areas are paved with asphalt, including over 65 percent of the interstate highway system. An environmentally friendly product, asphalt pavement is 100% recyclable, thus old pavement can be remixed with fresh materials and used repeatedly when repaving roads and other surfaces areas. Any surface area paved with asphalt is known as HMA, or hot mixed asphalt. HMA is a combination of approximately 95 percent stone, sand or gravel, with this material bound together by a product of crude oil known as an "asphalt binder."

To produce asphalt, the binder is heated and mixed with the aggregate materials at an HMA facility and then transported via trucks to the actual work site. This hot material is then dumped into special hoppers located at the front of paving machines and the asphalt is dispensed over the designated surface area. A heavy roller is then driven over the asphalt to evenly distribute the material, with workers on the ground using lute rakes and shovels to evenly spread the HMA. The entire process of laying asphalt takes place quite rapidly, as HMA requires a temperature of 175 degrees Fahrenheit in order to achieve proper density when compacting the asphalt onto the ground surface. Because asphalt cools so rapidly, those working to spread asphalt often encounter the quite frustrating scenario of the heavy asphalt hardening onto the tools used to spread the HMA on the ground surface.

As can be imagined, this hardened asphalt can be easily clump together between the tines of a lute rake, or encompass the entire surface of a shovel head or truck box in a manner of minutes, adding excessive weight to the tools and rendering these devices useless unless the asphalt is removed. To eradicate the asphalt from tools and equipment, many contractors utilize diesel fuel, an effective, yet illegal solution to the problem. Not surprisingly, pouring diesel fuel over a lute rake and then manually scraping it off the tool with a flat scraper knife can be a time consuming and tedious process. Resulting in the worker being exposed to dangerous diesel fumes, cleaning tools in this manner is a hazardous endeavor.

Further, although diesel fuel can indeed break down clumps of asphalt and enable the worker to clean their tools or HMA equipment such as truck boxes, doing so is not only dangerous to the worker, but environmentally hazardous as well, and as such environmental regulations prohibit its use. Those who do illegally utilize diesel fuel to maintain HMA equipment are at risk for harsh penalties and consequences should their use of the chemical be reported to the authorities. Importantly, diesel fuel can wreak havoc on the earth's fragile ecosystem. Typically dumped on the ground or into drainage systems following cleaning of HMA equipment, diesel fuel not only kills foliage, but also can easily seep into a town's water supply, contaminating the water and putting citizens at risk for a myriad of related health hazards.

Accordingly, a need remains for a non-stick, anti-asphalt tool in order to overcome at least one aforementioned shortcoming. The exemplary embodiment(s) satisfy such a need by providing a line of tools and equipment including lute rakes, shovels and truck boxes for use in the hot mix asphalt (HMA) construction industry, with these implements coated in a nonstick Teflon® or ceramic material that is convenient and easy to use, lightweight yet durable in design, versatile in its applications, and designed for providing an environmentally friendly alternative to traditional tools and ones which can be easily cleaned after a job is complete, without the use of illegal chemical solvents.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a hand tool for use in a hot mix asphalt (HMA) construction industry. These and other objects, features, and advantages of the non-limiting exemplary embodiment(s) are provided by a hand tool including an elongated handle suitably sized and shaped for handling HMA, and an implement attached to a distal end of the elongated handle. Such an implement includes: a non-stick, asphalt-resistant top layer, and a metal core directly attached to the non-stick, asphalt-resistant top layer, and a non-stick, asphalt-resistant bottom layer directly attached to the metal core. Notably, the metal core is intercalated between the non-stick, asphalt-resistant top layer and the non-stick, asphalt-resistant bottom layer. Advantageously, each of the non-stick, asphalt-resistant top layer and the non-stick, asphalt-resistant bottom layer prohibits hot mix asphalt from adhering onto the implement.

In a non-limiting exemplary embodiment, the non-stick, asphalt-resistant top layer has a first thickness, and the non-stick, asphalt-resistant bottom layer has a second thickness substantially equal to the first thickness. Notably, the metal core has a third thickness greater than the first thickness and the second thickness.

In a non-limiting exemplary embodiment, each of the non-stick, asphalt-resistant top layer and the non-stick, asphalt-resistant bottom layer includes a thermoplastic polymer containing polytetrafluoroethylene.

In a non-limiting exemplary embodiment, the implement is interchangeably connected to the distal end of the elongated handle.

In a non-limiting exemplary embodiment, the elongated handle includes a centrally registered longitudinal axis, wherein an entire longitudinal length of the elongated handle is coaxially aligned with the centrally registered longitudinal axis.

In a non-limiting exemplary embodiment, the implement includes: a triangular brace having an apex, and a first coupling disposed at the apex and having a first bore coaxially aligned with a centrally registered longitudinal axis of the elongated handle wherein the first coupling is slidably engaged with the distal end of the elongated handle. A pair of linear support arms are statically mated to the first coupling and diverge outwardly away therefrom. A plate has a planar posterior side facing towards and anchored to the linear support arms, and a second coupling is statically mated to the planar posterior side and has a second bore coaxially aligned with the first bore. Notably, the plate has a serrated longitudinal edge oriented perpendicular to the centrally registered longitudinal axis. Advantageously, the second coupling receives and is directly attached to the distal end of the elongated handle.

In a non-limiting exemplary embodiment, the implement includes a curvilinear coupling removably engaged to the distal end of the elongated handle, and a base provided with a raised peripheral edge extending along a major peripheral length of the peripheral edge. Notably, the curvilinear coupling is directly anchored to a top surface of the base.

In a non-limiting exemplary embodiment, the elongated handle includes a hollow gripping tube slidably inserted about a circumference of the elongated handle.

The present disclosure includes a method of utilizing hand tool for use in a hot mix asphalt (HMA) construction industry. Such a method includes the initial step of: providing an elongated handle suitably sized and shaped for handling HMA during a construction procedure; providing an implement attached to a distal end of the elongated handle. Such an implement includes a non-stick, asphalt-resistant top layer, a metal core directly attached to the non-stick, asphalt-resistant top layer, and a non-stick, asphalt-resistant bottom layer directly attached to the metal core. Notably, the metal core is intercalated between the non-stick, asphalt-resistant top layer and the non-stick, asphalt-resistant bottom layer.

The method further includes the steps of: each of the non-stick, asphalt-resistant top layer and the non-stick, asphalt-resistant bottom layer prohibiting hot mix asphalt from undesirably adhering onto the implement while using and directly engaging the implement with the HMA during the construction procedure; and without using diesel fuel or a chemical solvent, cleaning the implement thereby removing residual hot mix asphalt from the implement by performing the sub-steps of: providing and applying water directly on the implement containing the residual hot mix asphalt, and providing and wiping a cloth directly along the implement.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
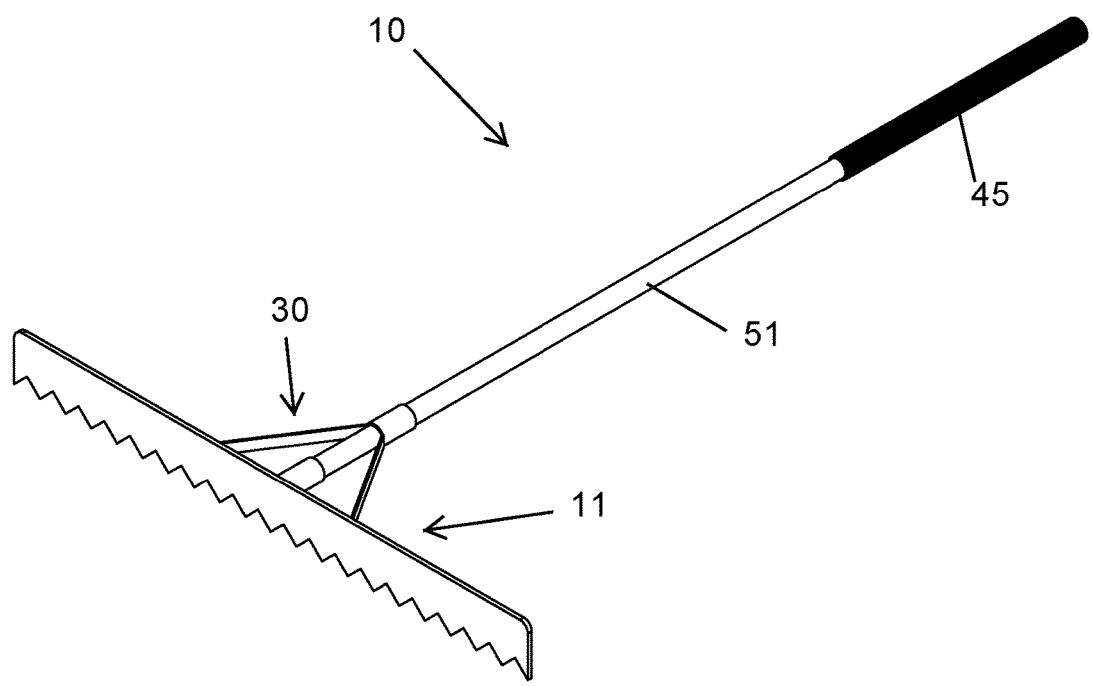
FIG. 1 is a perspective view illustrating a hand tool used in the hot mix asphalt (HMA) construction industry, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 2:
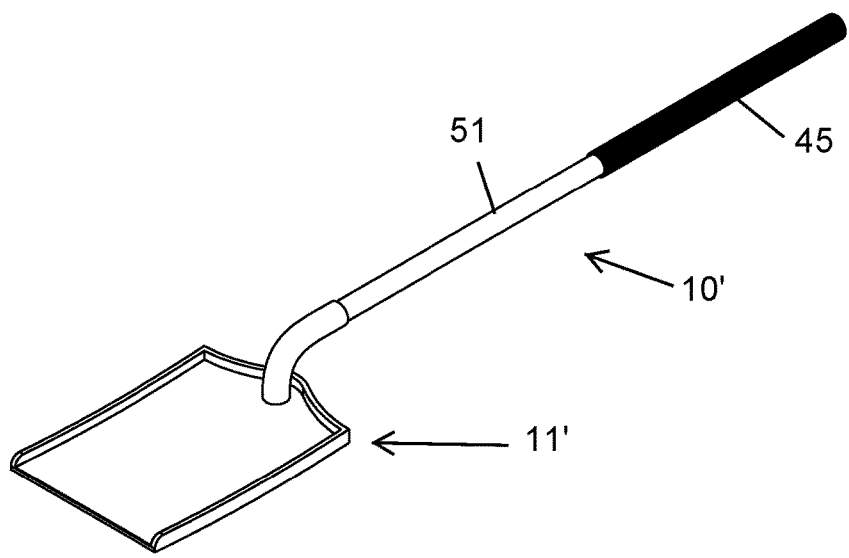
FIG. 2 is a perspective view illustrating a hand tool used in the hot mix asphalt (HMA) construction industry, in accordance with another non-limiting exemplary embodiment.
Figure 3:
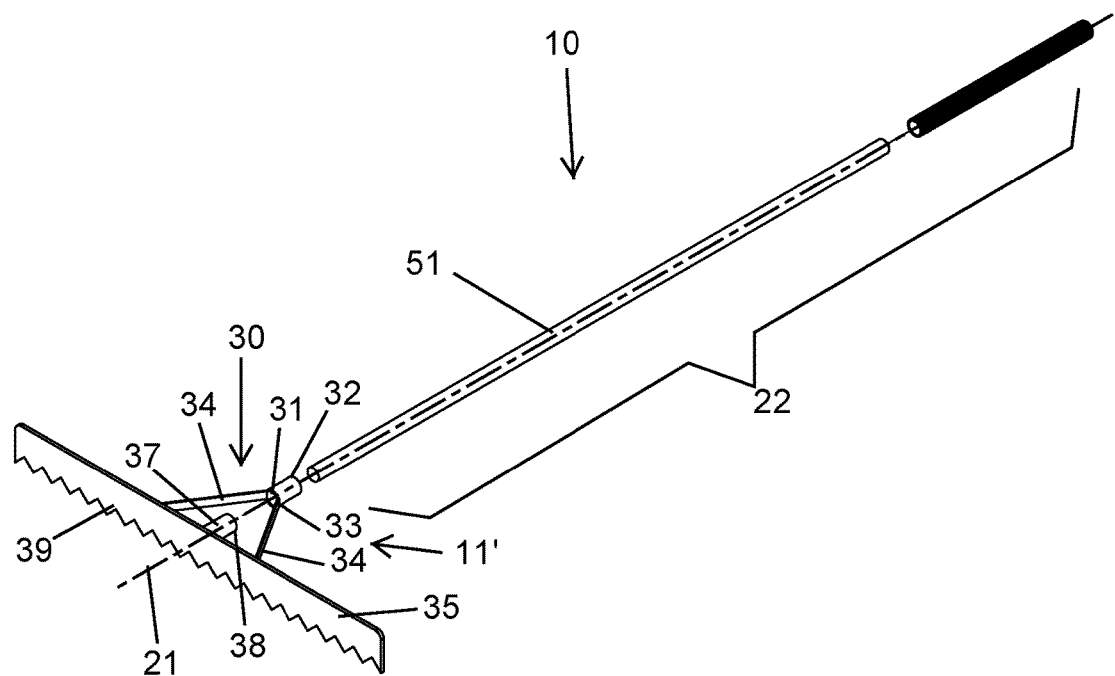
FIG. 3 is an exploded view of the hand tool shown in FIG. 1.
Figure 4:
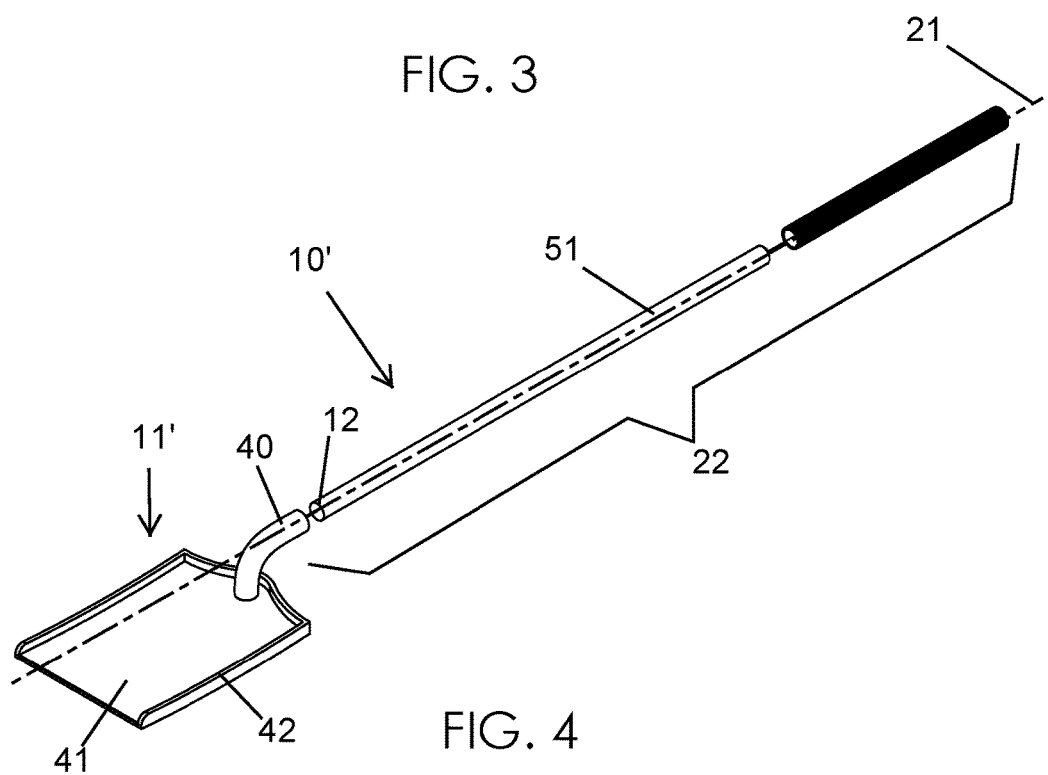
FIG. 4 is an exploded view of the hand tool shown in FIG. 2.
Figure 5:
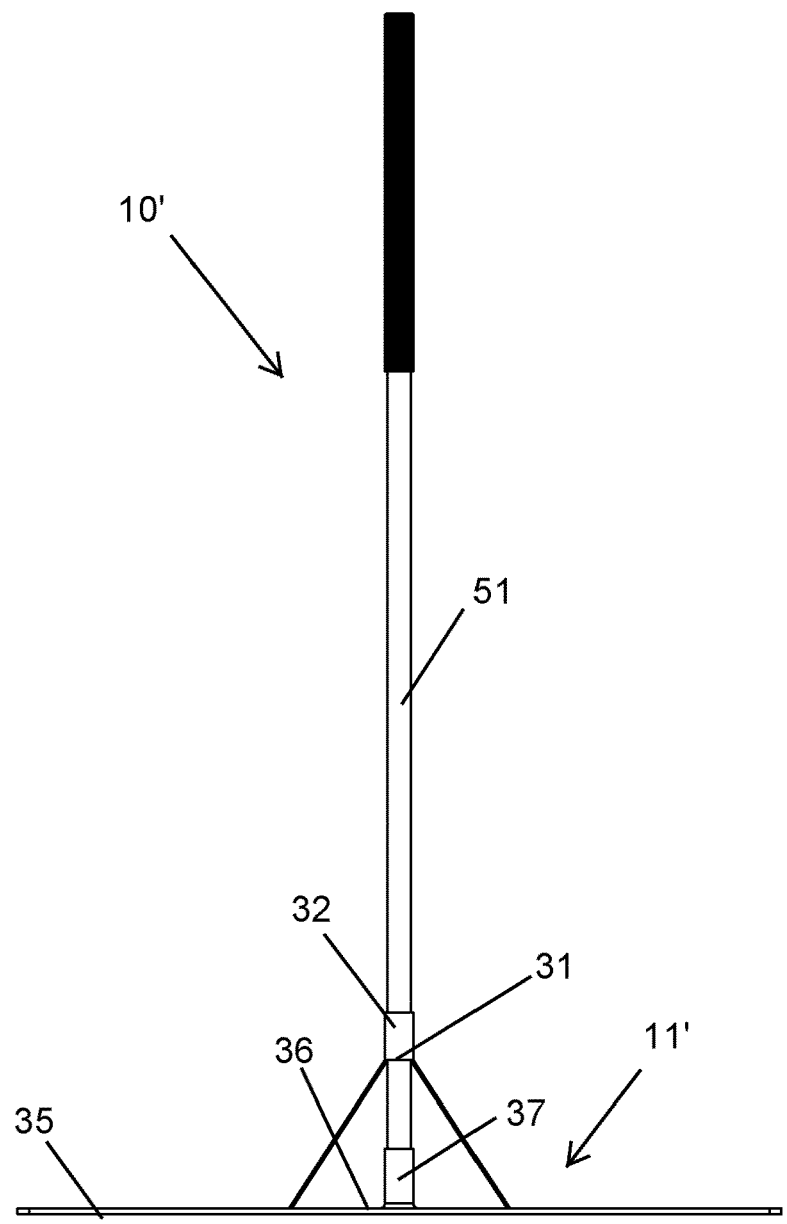
FIG. 5 is a top plan view of the hand tool shown in FIG. 1.
Figure 6:
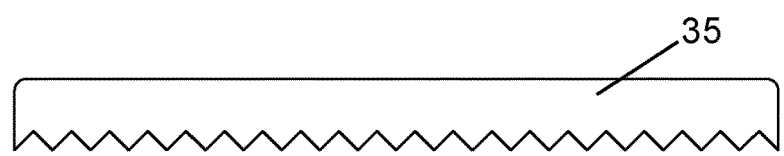
FIG. 6 is a front elevational view of the hand tool shown in FIG. 1.
Figure 7:
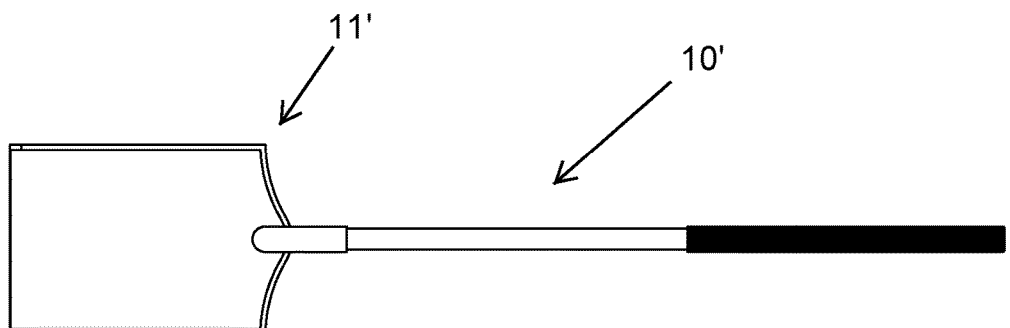
FIG. 7 is a top plan view of the hand tool shown in FIG. 2.
Figure 8:
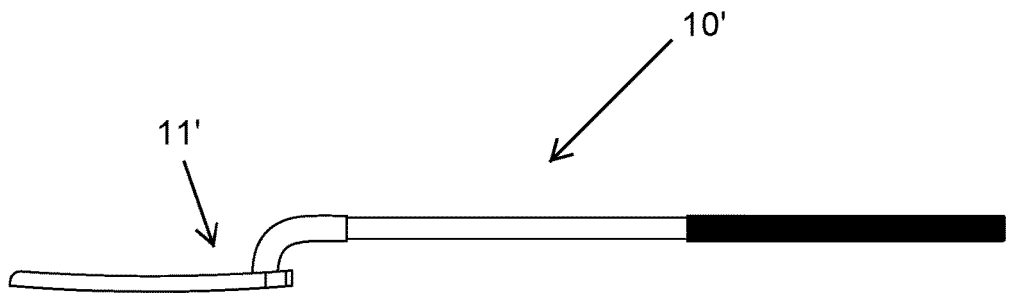
FIG. 8 is a side elevational view of the hand tool shown in FIG. 2.
Figure 9:
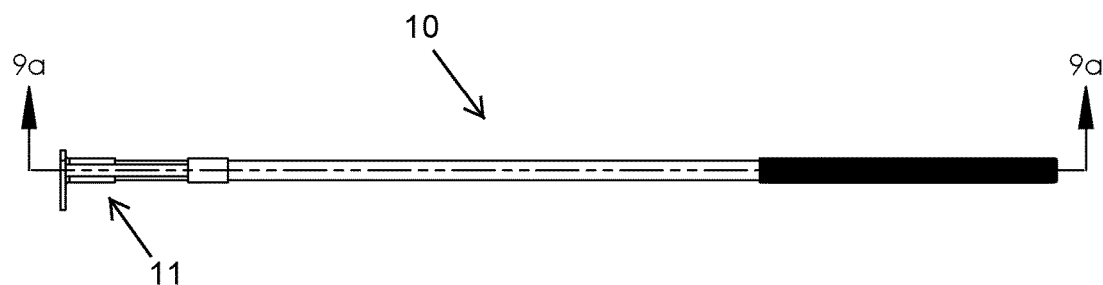
FIG. 9 is a side elevational view of the hand tool shown in FIG. 1.
Figure 9A:
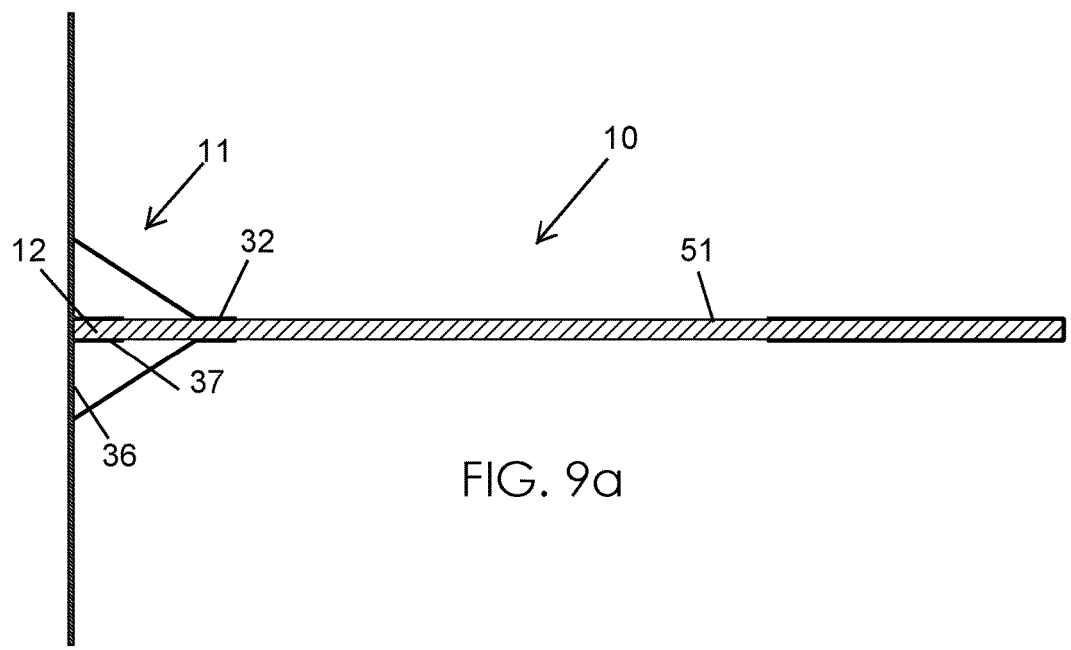
FIG. 9a is a cross-sectional view taken along line 9a-9a in FIG. 9.
Figure 10:
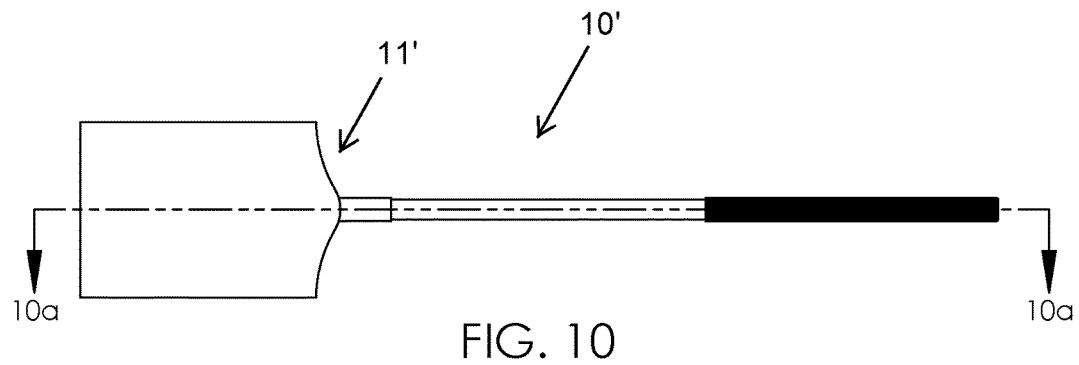
FIG. 10 is a top plan view of the hand tool shown in FIG. 2.
Figure 10A:
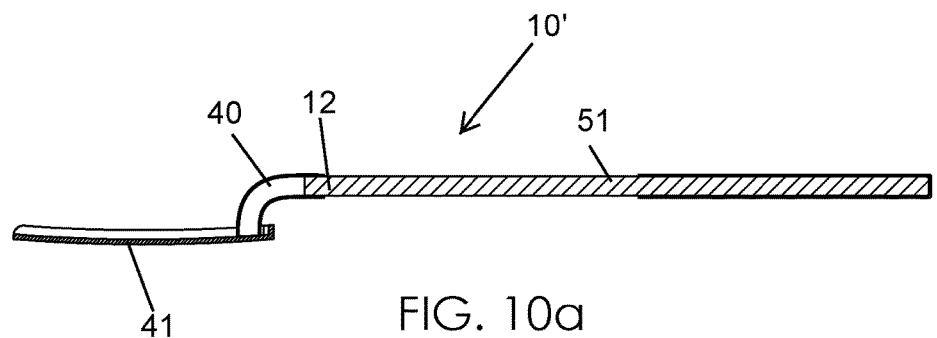
FIG. 10a is a cross-sectional view taken along line 10a-10a in FIG. 10.
Figure 11:
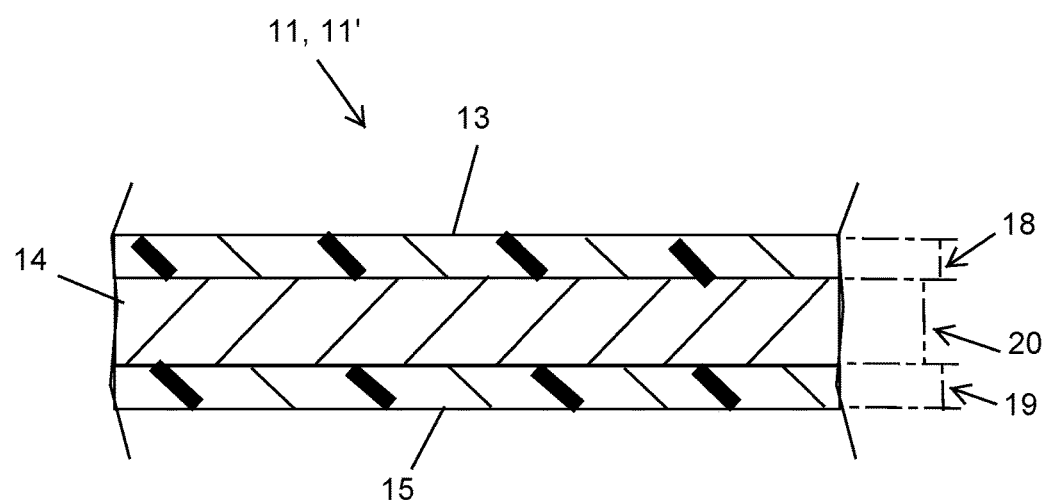
FIG. 11 is a non-limiting exemplary cross-sectional view showing both non-stick, asphalt-resistant top and bottom layers coated about the implement, in accordance with both of the non-limiting exemplary embodiments shown in FIGS. 1 and 2.

Non-limiting exemplary embodiment(s) of the present disclosure are referred to generally in FIGS. 1-11 and are intended to provide tools/equipment such as lute rakes, shovels and truck boxes for use in the hot mix asphalt (HMA) construction industry. Notably, implements 11, 11' are coated in a nonstick TEFLON® or ceramic material for providing an environmentally friendly alternative to traditional tools and ones which can be easily cleaned after a job is complete, without the use of illegal or harsh chemical solvents. It should be understood that the exemplary embodiment(s) may be used with a variety of hot mix asphalt species, and should not be limited to any particular hot mix asphalt species described herein.

Referring generally to FIGS. 1-11, the hand tool 10, 10' includes an elongated handle 51 suitably sized and shaped for handling HMA, and an implement 11, 11' attached to a distal end 12 of the elongated handle 51. Such an implement 11, 11' includes: a non-stick, asphalt-resistant top layer 13, and a metal core 14 directly attached to the non-stick, asphalt-resistant top layer 13, and a non-stick, asphalt-resistant bottom layer 15 directly attached to the metal core 14. Notably, the metal core 14 is intercalated between the non-stick, asphalt-resistant top layer 13 and the non-stick, asphalt-resistant bottom layer 15. Thus, the metal core 14 is completely coated all around. Advantageously, each of the non-stick, asphalt-resistant top layer 13 and the non-stick, asphalt-resistant bottom layer 15 prohibits hot mix asphalt from undesirably adhering onto the implement 11, 11'.

In a non-limiting exemplary embodiment, the non-stick, asphalt-resistant top layer 13 and bottom layer 15 preferably include a non-stick, asphalt-resistant coating that contains a thermoplastic polymer such as polytetrafluoroethylene (PTFE), which is a synthetic fluoropolymer used in various applications including non-stick coatings. TEFLON® is a brand of PTFE, often used as a generic term for PTFE. Such a metallic substrate is roughened to promote adhesion, and layers of PTFE, preferably from one to seven, are sprayed or rolled on to the metal core 14, with a larger number of layers and spraying being better. The number and thickness of the layers 13, 15 and quality of the material determine the quality of the non-stick, asphalt-resistant coating.

In a non-limiting exemplary embodiment, the non-stick, asphalt-resistant top layer 13 has a first thickness 18, and the non-stick, asphalt-resistant bottom layer 15 has a second thickness 19 substantially equal to the first thickness 18. Notably, the metal core 14 has a third thickness 20 greater than the first thickness 18 and the second thickness 19.

In a non-limiting exemplary embodiment, each of the non-stick, asphalt-resistant top layer 13 and the non-stick, asphalt-resistant bottom layer 15 includes a thermoplastic polymer containing polytetrafluoroethylene.

In a non-limiting exemplary embodiment, the implement 11, 11' is interchangeably connected to the distal end 12 of the elongated handle 51.

In a non-limiting exemplary embodiment, the elongated handle 51 includes a centrally registered longitudinal axis 21, wherein an entire longitudinal length 22 of the elongated handle 51 is coaxially aligned with the centrally registered longitudinal axis 21.

In a non-limiting exemplary embodiment, the implement 11 includes: a triangular brace 30 having an apex 31, and a first coupling 32 disposed at the apex 31 and having a first bore 33 coaxially aligned with a centrally registered longitudinal axis 21 of the elongated handle 51 wherein the first coupling 32 is slidably engaged with the distal end 12 of the elongated handle 51. A pair of linear support arms 34 are statically mated to the first coupling 32 and diverge outwardly away therefrom. A plate 35 has a planar posterior side 36 facing towards and anchored to the linear support arms 34, and a second coupling 37 is statically mated to the planar posterior side 36 and has a second bore 38 coaxially aligned with the first bore 33. Notably, the plate 35 has a serrated longitudinal edge 39 oriented perpendicular to the centrally registered longitudinal axis 21. Advantageously, the second coupling 37 receives and is directly attached to the distal end 12 of the elongated handle 51.

In a non-limiting exemplary embodiment, the implement 11' includes a curvilinear coupling 40 removably engaged to the distal end 12 of the elongated handle 51, and a base 41 provided with a raised peripheral edge 42 extending along a major peripheral length (length along the majority) of the peripheral edge 42. Notably, the curvilinear coupling 40 is directly anchored to a top surface of the base 41.

In a non-limiting exemplary embodiment, the elongated handle 51 includes a hollow gripping tube 45 slidably inserted about a circumference of the elongated handle 51.

The present disclosure includes a method of utilizing hand tool 10, 10' for use in a hot mix asphalt (HMA) construction industry. Such a method includes the initial step of: providing an elongated handle 51 suitably sized and shaped for handling HMA during a construction procedure; providing an implement 11, 11' attached to a distal end 12 of the elongated handle 51. Such an implement 11, 11' includes a non-stick, asphalt-resistant top layer 13, a metal core 14 directly attached to the non-stick, asphalt-resistant top layer 13, and a non-stick, asphalt-resistant bottom layer 15 directly attached to the metal core 14. Notably, the metal core 14 is intercalated between the non-stick, asphalt-resistant top layer 13 and the non-stick, asphalt-resistant bottom layer 15.

The method further includes the steps of: each of the non-stick, asphalt-resistant top layer 13 and the non-stick, asphalt-resistant bottom layer 15 prohibiting hot mix asphalt from undesirably adhering onto the implement 11, 11' while using and directly engaging the implement 11, 11' with the HMA during the construction procedure; and without using diesel fuel or a chemical solvent, cleaning the implement 11, 11' thereby removing residual hot mix asphalt from the implement 11, 11' by performing the sub-steps of: providing and applying water directly on the implement 11, 11' containing the residual hot mix asphalt, and providing and wiping a cloth directly along the implement 11, 11'.

Referring to FIGS. 1-11 in general, in a non-limiting exemplary embodiment(s), the non-stick, asphalt-resistive tool 10, 10' is for use in laying asphalt, and includes a nonstick coating that effectively prevents the asphalt from adhering to and hardening on the tool's surface. As such, use of the tool 10, 10' effectively eliminates the need to utilize diesel fuel or other harmful solvents to clean the tool following use, affording an environmentally friendly alternative to traditional tools. The non-stick, asphalt-resistive tool 10, 10' may include lute rakes, shovels and even asphalt equipment such as truck boxes, each coated in a heavy duty TEFLON® or ceramic nonstick coating that facilitates easy clean up following use.

These tools 10, 10' boast an elongated, ergonomic handle 51 that enable the user to safely maneuver the tool head 11, 11' across hot asphalt while standing comfortably upright. Manufactured of heavy duty polished wood or metal material, these handles 51 could be topped with nonskid plastic or rubber hand grips 45 that facilitate comfortable handling during use. Asphalt lute rakes and hand rakes could feature lightweight aluminum or comparable rigid metal "T" beam heads that feature a row of sharpened teeth on one side of the tool, while the opposite side would feature a smooth edge. Shovel heads could also a feature rigid metal base 41 and could be offered as square edged razor-back shovels designed to scoop asphalt with ease. Other tools might include crack hoes, tamp tools and asphalt squeegees, to name a few considerations.

As mentioned, the non-stick, asphalt-resistive tool 10, 10' could also include heavy equipment such as truck boxes. The most notable aspect is the non-stick, asphalt-resistive coating however, and that which sets this tool 10, 10' apart from other tools traditionally utilized in the HMA industry, is found in the heavy duty nonstick TEFLON® or ceramic material that coats the surface of the tool head. A product of the DUPONT® company, TEFLON® is a high-performance compound used in a variety of industrial and consumer applications. DUPONT® nonstick coatings feature PTFE (polytetrafluoroethylene), which is a high-performance fluoropolymer that is easy to clean, nonstick and boasts both high repellency and durability. The non-stick, asphalt-resistive tool 10, 10' could also be manufactured featuring a high-performance nonstick ceramic coating. As with traditional nonstick ceramic items, the ceramic material utilized in the manufacture of the non-stick, asphalt-resistive tool 10, 10' could be a scratch, chip and flake resistant ceramic that is coated over the tool head and high fired.

As with the previously mentioned TEFLON®, this non-stick ceramic coating would be a durable and repellant material that enables the user to clean the hardened asphalt of the surface of the tool or equipment in a quick and easy fashion and without the use of chemical solvents. As such, the non-stick, asphalt-resistive tool 10, 10' would be utilized in the same manner as traditional asphalt tools and equipment, with truck boxes lined with the TEFLON® or ceramic coating and utilized to transport and dispense the hot asphalt; and tools such as lute rakes, shovels and tamp tools utilized to spread the asphalt on the designated ground surface. Once the asphalt has been properly spread on the ground surface, whether a roadway or household driveway, the construction worker would simply spray the surface of the tool with water, or merely wipe the tool with a soft cloth, in order to effortlessly eradicate any asphalt residue from the tool's nonstick surface; (e.g., implement 11, 11'). In this manner, the tools (or equipment) could be effortlessly cleaned without the use of harsh solvents such as diesel fuel, offering a safe, legal and environmentally friendly means of caring for equipment.

The non-stick, asphalt-resistive tool 10, 10' is an innovative product which offers contractors and other construction professionals a number of significant benefits and advantages. Foremost, the non-stick, asphalt-resistive tool 10, 10' provides professional HMA contractors a practical alternative to traditional tools and ones which could be easily maintained with minimal effort. An entire line of hand tools including lute rakes, shovels and tamp tools, as well as equipment such as truck boxes all boasting a nonstick TEFLON® or ceramic surface, the non-stick, asphalt-resistive tool 10, 10' provides HMA workers heavy duty hardware that can be effortlessly cleaned once a job is complete. Professionals should appreciate that the durable, nonstick surface of tools and equipment in the non-stick, asphalt-resistive tool 10, 10' line effectively prevents asphalt from hardening onto the tool head, thus enabling them to safely and easily maintain this expensive equipment. With asphalt easily sliding off the surface of the tool 10, 10', workers are spared the daunting task of lifting tools that are caked in heavy asphalt, thus eliminating much of the strain and physical exertion associated with this previously back-breaking work.

A practical alternative to utilizing diesel fuel and other stringent solvents to break down hardened asphalt and clean tools, the non-stick, asphalt-resistive tool 10, 10' proves an environmentally friendly product that would protect both the health of the worker, as well as the well-being of the earth's fragile ecosystem. With the non-stick, asphalt-resistive tool 10, 10', a contractor would never again be at risk for steep fines and penalties associated with using illegal chemicals to maintain their tools. Further, because the non-stick, asphalt-resistive tool 10, 10' is easily maintained—with tools and equipment quickly cleaned without the use of expensive solvents—use of this line reduces expenses and increase efficiency on the job; a money savings benefit that could result in greater profits for the contractor. Durably constructed, tools and equipment in the non-stick, asphalt-resistive tool 10, 10' should withstand years of repeated use, with ease.

The non-stick, asphalt-resistive tool 10, 10' is a practical product which offers HMA contractors a line of tools that are safe, convenient and environmentally friendly to use. Boasting nonstick surfaces that prevent asphalt from hardening on the tool, this cleverly conceived product line could potentially revolutionize the HMA industry. Reasonably priced, the non-stick, asphalt-resistive tool 10 should be well received by HMA contractors and similar professionals, a very sizable market potential.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A method of utilizing hand tool for use in a hot mix asphalt (HMA) construction industry, said method comprising the steps of:
   accessing a quantity of HMA during a road construction procedure;
   providing an elongated handle suitably sized and shaped for handling said HMA during the road construction procedure;
   providing an implement attached to a distal end of said elongated handle, said implement including a non-stick, asphalt-resistant top layer, a metal core directly attached to said non-stick, asphalt-resistant top layer, and a non-stick, asphalt-resistant bottom layer directly attached to said metal core; wherein said metal core is intercalated between said non-stick, asphalt-resistant top layer and said non-stick, asphalt-resistant bottom layer;
   a user safely maneuvering said implement across said HMA;
   spreading said HMA, via said implement, across a ground surface during the road construction procedure;
   each of said non-stick, asphalt-resistant top layer and said non-stick, asphalt-resistant bottom layer prohibiting hot mix asphalt from undesirably adhering onto said implement while using and directly engaging said implement with said HMA during the road construction procedure; and
   without using water or other fluid, cleaning said implement thereby removing residual HMA from said implement by
       providing and wiping a cloth directly along said implement.

* * * * *